US009885491B2

(12) United States Patent
Kitazaki

(10) Patent No.: US 9,885,491 B2
(45) Date of Patent: Feb. 6, 2018

(54) MANAGEMENT APPARATUS FOR AIR-CONDITIONING APPARATUS AND MANAGEMENT SYSTEM FOR AIR-CONDITIONING APPARATUS

(71) Applicant: Mitsubishi Electric Corporation, Tokyo (JP)

(72) Inventor: Mitsuru Kitazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 14/774,912

(22) PCT Filed: Apr. 8, 2013

(86) PCT No.: PCT/JP2013/060639
§ 371 (c)(1),
(2) Date: Sep. 11, 2015

(87) PCT Pub. No.: WO2014/167633
PCT Pub. Date: Oct. 16, 2014

(65) Prior Publication Data
US 2016/0033153 A1  Feb. 4, 2016

(51) Int. Cl.
F24F 11/00 (2006.01)
G05B 15/02 (2006.01)
(Continued)

(52) U.S. Cl.
CPC ............ *F24F 11/006* (2013.01); *G05B 15/02* (2013.01); *G08C 17/00* (2013.01); *H04L 12/283* (2013.01);
(Continued)

(58) Field of Classification Search
CPC .. F24F 11/006; F24F 2011/0075; H04W 4/02; G05B 15/02; H04L 12/2816;
(Continued)

(56) References Cited

U.S. PATENT DOCUMENTS 7,813,950 B2 * 10/2010 Perrella .......... G06Q 10/063116
705/7.16
8,260,444 B2 *  9/2012 Kowald ................ F24F 11/006
236/76
(Continued)

FOREIGN PATENT DOCUMENTS

JP  H11-182916 A  7/1999
JP  2005-295160 A  10/2005
(Continued)

OTHER PUBLICATIONS

International Search Report of the International Searching Authority dated Jul. 9, 2013 for the corresponding international application No. PCT/JP2013/060639 (and English translation).
(Continued)

*Primary Examiner* — Ramesh Patel
(74) *Attorney, Agent, or Firm* — Posz Law Group, PLC

(57) ABSTRACT

A management apparatus for an air-conditioning apparatus configured to manage a plurality of air-conditioning apparatuses configured to condition air in an air-conditioning target space includes: a management-side communication unit to receive data of arrival locations and arrival times in the space transmitted from a plurality of terminal devices; and a management-side arithmetic unit configured to perform totaling based on the data of the arrival locations and the arrival times received by the management-side communication unit, and to perform a process of determining an order in which operation is started in the plurality of air-conditioning apparatuses. Operation is performed in order, and thus a steep increase in power consumption can be reduced.

7 Claims, 6 Drawing Sheets

(51) Int. Cl.
*H04W 4/02* (2009.01)
*H04Q 9/00* (2006.01)
*G08C 17/00* (2006.01)
*H04L 12/28* (2006.01)

(52) U.S. Cl.
CPC ...... *H04L 12/2816* (2013.01); *H04L 12/2827* (2013.01); *H04Q 9/00* (2013.01); *H04W 4/02* (2013.01); *F24F 2011/0075* (2013.01); *G08C 2201/34* (2013.01); *G08C 2201/91* (2013.01)

(58) Field of Classification Search
CPC ... H04L 12/2827; H04L 12/283; G08C 17/00; G08C 2201/91; G08C 2201/34; H04Q 9/00
See application file for complete search history.

(56) References Cited

U.S. PATENT DOCUMENTS

| | | | | |
|---|---|---|---|---|
| 8,290,479 | B2* | 10/2012 | Aaron | G06Q 10/109 379/201.06 |
| 8,396,602 | B2* | 3/2013 | Imes | H04L 67/42 700/276 |
| 8,571,518 | B2* | 10/2013 | Imes | H04L 67/42 236/91 E |
| 8,635,320 | B2* | 1/2014 | Ishizaka | F24F 11/0086 700/276 |
| 9,008,845 | B2* | 4/2015 | Cho | F24F 11/006 700/17 |
| 9,074,786 | B2* | 7/2015 | Gyota | F24F 11/006 |
| 9,360,874 | B2* | 6/2016 | Imes | F24F 11/0012 |
| 9,441,850 | B2* | 9/2016 | Sato | F24F 11/0009 |
| 9,513,023 | B2* | 12/2016 | Ogura | F24F 11/0086 |
| 9,528,715 | B2* | 12/2016 | Aiken | F24F 11/0001 |
| 9,671,124 | B2* | 6/2017 | Sakaguchi | F24F 11/006 |
| 2003/0140637 | A1* | 7/2003 | Masui | F24F 11/006 62/127 |
| 2004/0243712 | A1* | 12/2004 | Sakai | H04L 41/00 709/227 |
| 2009/0139251 | A1* | 6/2009 | Masui | F24F 11/0009 62/129 |
| 2010/0332596 | A1* | 12/2010 | Perrella | G06Q 10/063116 709/203 |
| 2011/0057044 | A1* | 3/2011 | Nishino | F24F 11/0086 236/49.3 |
| 2012/0067560 | A1* | 3/2012 | Bergman | F24F 11/006 165/238 |
| 2013/0024233 | A1* | 1/2013 | Aaron | G06Q 10/109 705/7.19 |
| 2015/0192939 | A1* | 7/2015 | Joo | G05B 15/02 700/277 |
| 2015/0377506 | A1* | 12/2015 | Sakaguchi | F24F 11/006 700/276 |
| 2016/0163138 | A1* | 6/2016 | Turner | G07C 9/00166 340/5.7 |
| 2016/0306027 | A1* | 10/2016 | Chrabieh | G01S 5/0215 |

FOREIGN PATENT DOCUMENTS

| | | |
|---|---|---|
| JP | 2008-256260 A | 10/2008 |
| JP | 2008-281239 A | 11/2008 |
| JP | 2009-191575 A | 8/2009 |
| JP | 2009-250589 A | 10/2009 |
| JP | 2012-255567 A | 12/2012 |
| WO | 2008/087959 A1 | 7/2008 |
| WO | 2012/053230 A1 | 4/2012 |

OTHER PUBLICATIONS

Office Action dated Jun. 7, 2016 in the corresponding JP patent application No. 2015-510980 (with English translation).
Office Action dated Jan. 31, 2017 in the corresponding JP patent application No. 2015-510980 (with English translation).

* cited by examiner

FIG. 2

- AIR-CONDITIONING APPARATUS GROUP A:
  GROUP IN WHICH AIR-CONDITIONING APPARATUS Ax to Az ARE USED
- AIR-CONDITIONING APPARATUS GROUP B:
  GROUP IN WHICH AIR-CONDITIONING APPARATUS Bx to Bz ARE USED
- AIR-CONDITIONING APPARATUS GROUP C:
  GROUP IN WHICH AIR-CONDITIONING APPARATUS Cx to Cz ARE USED
- AIR-CONDITIONING APPARATUS GROUP D:
  GROUP IN WHICH AIR-CONDITIONING APPARATUS Dx to Dz ARE USED
- AIR-CONDITIONING APPARATUS GROUP E:
  GROUP IN WHICH AIR-CONDITIONING APPARATUS Ex to Ez ARE USED
- AIR-CONDITIONING APPARATUS GROUP F:
  GROUP IN WHICH AIR-CONDITIONING APPARATUS Fx to Fz ARE USED

F I G. 4

| ARRIVAL TIME | AIR-CONDI-TIONING APPARATUS GROUP A | AIR-CONDI-TIONING APPARATUS GROUP B | AIR-CONDI-TIONING APPARATUS GROUP C | AIR-CONDI-TIONING APPARATUS GROUP D | AIR-CONDI-TIONING APPARATUS GROUP E | AIR-CONDI-TIONING APPARATUS GROUP F |
|---|---|---|---|---|---|---|
| 10:00 | 0 | 0 | 0 | 0 | 10 | 0 |
| 10:10 | 1 | 0 | 5 | 0 | 0 | 0 |
| 10:20 | 5 | 6 | 0 | 0 | 0 | 0 |
| 10:30 | 2 | 6 | 1 | 0 | 0 | 0 |
| 10:40 | 1 | 0 | 5 | 0 | 0 | 0 |
| 10:50 | 3 | 0 | 1 | 12 | 2 | 0 |

F I G. 5

| MEETING TIME | AIR-CONDI-TIONING APPARATUS GROUP A | AIR-CONDI-TIONING APPARATUS GROUP B | AIR-CONDI-TIONING APPARATUS GROUP C | AIR-CONDI-TIONING APPARATUS GROUP D | AIR-CONDI-TIONING APPARATUS GROUP E | AIR-CONDI-TIONING APPARATUS GROUP F |
|---|---|---|---|---|---|---|
| 10:00 | 0 | 0 | 0 | 0 | 10 | 0 |
| 10:10 | 1 | 0 | 5 | 0 | 10 | 0 |
| 10:20 | 6 | 6 | 5 | 0 | 10 | 0 |
| 10:30 | 8 | 12 | 6 | 0 | 10 | 0 |
| 10:40 | 9 | 12 | 11 | 1 | 10 | 0 |
| 10:50 | 12 | 12 | 12 | 11 | 12 | 12 |

IF GROUPS HAVE SAME NUMBER OF ARRIVALS, GROUP HAVING LARGER NUMBER OF ARRIVALS THAN OTHER GROUP IN SUBSEQUENT TIME SLOT IS PRIORITIZED

| OPERATION START ORDER | AIR-CONDITIONING APPARATUS GROUP IN WHICH OPERATION IS STARTED |
|---|---|
| 1 | GROUP E |
| 2 | GROUP C |
| 3 | GROUP B |
| 4 | GROUP A |
| 5 | GROUP D |
| 6 | GROUP F |

US 9,885,491 B2

MANAGEMENT APPARATUS FOR AIR-CONDITIONING APPARATUS AND MANAGEMENT SYSTEM FOR AIR-CONDITIONING APPARATUS

CROSS REFERENCE TO RELATED APPLICATION

This application is a U.S. national stage application of International Application No. PCT/JP2013/060639 filed on Apr. 8, 2013, the disclosure of which is incorporated herein by reference.

TECHNICAL FIELD

This invention relates to a management apparatus for an air-conditioning apparatus or the like. In particular, the management apparatus for an air-conditioning apparatus or the like manages starts of operation of a plurality of air-conditioning apparatuses on the basis of how many people gather.

BACKGROUND ART

For example, in an apparatus that manages and controls an air-conditioning apparatus (air conditioner), the air-conditioning apparatus is controlled in various ways to achieve energy savings. For example, a mobile terminal which a person near an air-conditioning apparatus has with him/her calculates a time of arrival at the air-conditioning apparatus (air-conditioning target space) on the basis of position coordinates acquired from a built-in GPS (Global Positioning System), and transmits it. A technique is proposed in which a control device having received a signal controls an operating state, a temperature setting, and so forth of the air-conditioning apparatus on the basis of data of the arrival time contained in the signal, and changes a setting so as to achieve energy savings (see, for example, Patent Literature 1).

CITATION LIST

Patent Literature

Patent Literature 1: Japanese Unexamined Patent Application Publication No. 2005-295160

SUMMARY OF INVENTION

Technical Problem

For example, in the case of an environment in which individual rooms are provided (an environment in which a plurality of small spaces are separated), such as a building, an air-conditioning apparatus is installed in each space, and only an air-conditioning apparatus in a space to be used is operated. On the other hand, in the case of a large air-conditioning target space, such as an event hall, in many cases, many air-conditioning apparatuses are installed, and a management apparatus for an air-conditioning apparatus or the like performs centralized management of the air-conditioning apparatuses so as to condition air. Then, under the management of the management apparatus for an air-conditioning apparatus, as for an operation start time or the like of an air-conditioning control device, an operation schedule is typically preset in accordance with a start time or the like of an event to be held at the event hall.

For example, in a spacious place, such as an event hall, control is performed in which a plurality of air-conditioning apparatuses are operated all at once in accordance with a start time of an event regardless of whether or not there are people, and a large amount of energy is therefore consumed instantaneously. An air-conditioning apparatus typically consumes a large amount of power at the start of operation, total power consumption is steeply increased in the case where all the air-conditioning apparatuses are put into an operating state at once, and a function of demand or the like is therefore likely to work.

Furthermore, for example, in Patent Literature 1 described above, the location of a person is identified and transmitted to an air-conditioning apparatus to measure a distance relationship between the air-conditioning apparatus and the person, and such a technique is an obstacle to practical utilization in terms of, for example, privacy or the like.

This invention has been accomplished to solve the problem, and provides a management apparatus for an air-conditioning apparatus or the like enabling a reduction in power consumption or the like through a simple process.

Solution to Problem

A management apparatus for an air-conditioning apparatus according to this present invention is a management apparatus for an air-conditioning apparatus configured to manage a plurality of air-conditioning apparatuses configured to condition air in an air-conditioning target space. The management apparatus for an air-conditioning apparatus includes a management-side communication unit to receive data of arrival locations and arrival times in the air-conditioning target space transmitted from a plurality of terminal devices; and a management-side arithmetic unit to perform totaling based on the data of the arrival locations and the arrival times received by the management-side communication unit, and to perform a process of determining an order in which operation is started in the plurality of air-conditioning apparatuses.

Advantageous Effects of Invention

According to this invention, since the management-side arithmetic unit performs totaling on the basis of the data of the arrival locations and the arrival times in the space transmitted from the plurality of terminal devices, and determines the order in which operation of the air-conditioning apparatuses is started, operation can be started, for example, at a different time on the basis of the order, and a steep increase in power consumption can be reduced.

BRIEF DESCRIPTION OF DRAWINGS

FIG. 2 illustrates relationships between seats in an event hall and groups.

FIG. 4 illustrates an image of a totaling process result.

FIG. 5 illustrates an image of a determination of a priority order made on the basis of a totaling result.

DESCRIPTION OF EMBODIMENTS

Embodiment 1

Embodiment 1 of this invention will be described below with reference to the drawings and so forth. Here, the forms of components presented below are merely examples, and are not limited to the forms described in Embodiment 1.

Figure 1:
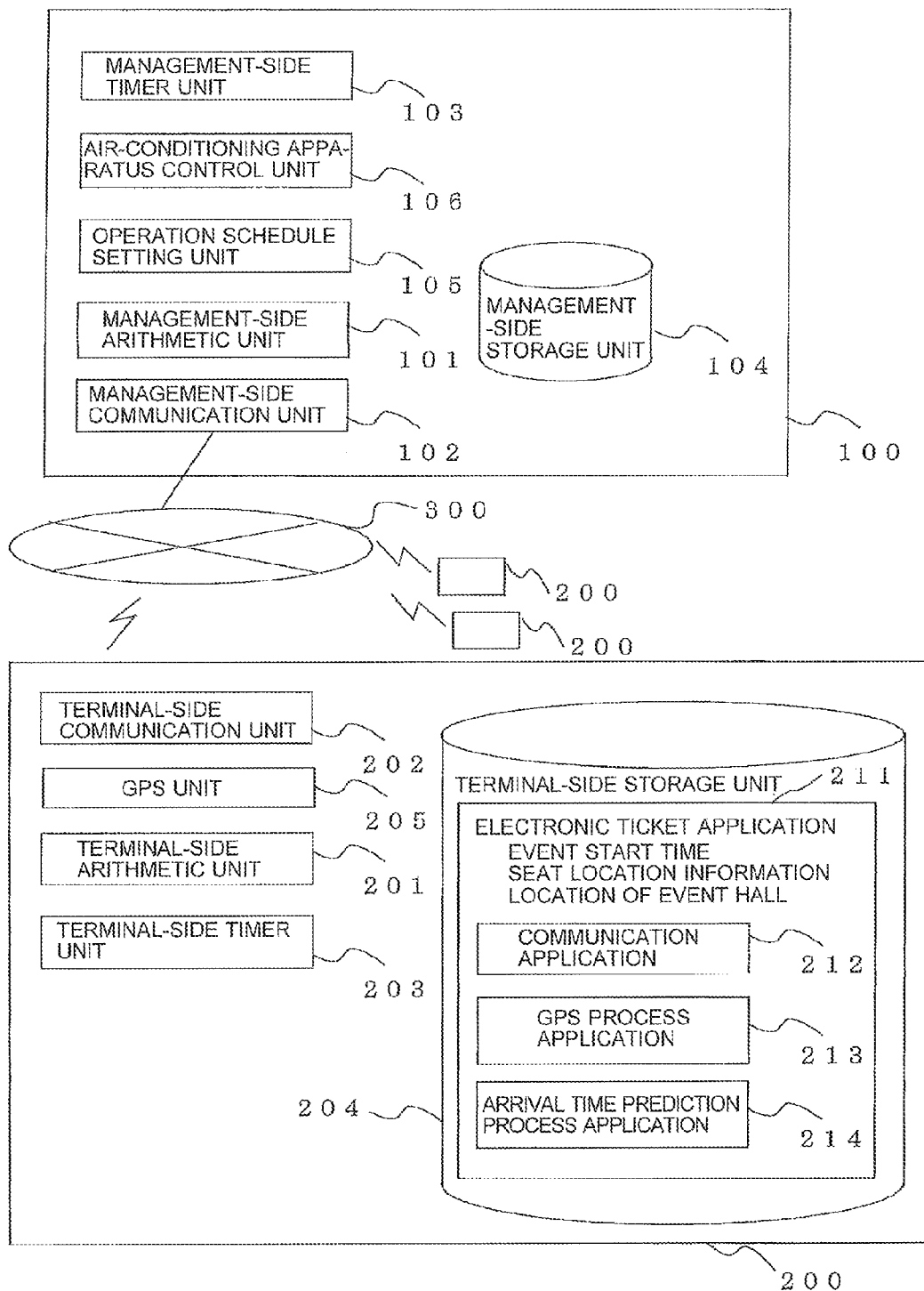
FIG. 1 illustrates the configuration of a management system for an air-conditioning apparatus including a management apparatus for an air-conditioning apparatus 100 according to Embodiment 1 of this invention.

FIG. 1 illustrates the configuration of a management system for an air-conditioning apparatus including a management apparatus for an air-conditioning apparatus 100 according to Embodiment 1 of this invention. The system in Embodiment 1 includes the management apparatus for an air-conditioning apparatus 100 and a plurality of terminal devices 200. The management apparatus for an air-conditioning apparatus 100 can establish a communication connection to the plurality of terminal devices 200 via a wired or wireless telecommunication network (network) 300.

The management apparatus for an air-conditioning apparatus 100 in Embodiment 1 performs management control on a plurality of air-conditioning apparatuses installed in an event hall (event venue) with reserved seats. The management apparatus for an air-conditioning apparatus 100 includes a management-side arithmetic unit 101, a management-side communication unit 102, a management-side clock unit 103, a management-side storage unit 104, an operation schedule setting unit 105, and an air-conditioning apparatus control unit 106.

The management-side arithmetic unit 101 performs various arithmetic processes for the management apparatus for an air-conditioning apparatus 100 managing the air-conditioning apparatuses. In Embodiment 1, for example, a process of compiling the number of arrivals in each time slot, a process of determining a priority order, and so forth are performed. The management-side communication unit 102 includes, for example, a wireless communication device or the like, communicates with the terminal devices 200, and receives a signal containing data required for the management-side arithmetic unit 101 to perform a process. The management-side clock unit 103 measures time for the management-side arithmetic unit 101 acquiring data of a time. The management-side storage unit 104 stores data and the like required for the management-side arithmetic unit 101 (management apparatus for an air-conditioning apparatus 100) to perform a process. The operation schedule setting unit 105 sets various pieces of data on an operation schedule of air-conditioning apparatuses to be managed by the management apparatus for an air-conditioning apparatus 100 on the basis of an instruction of an administrator. The air-conditioning apparatus control unit 106 performs a control process on a plurality of air-conditioning apparatuses to be managed.

On the other hand, the terminal devices 200 in Embodiment 1 communicate with the management apparatus for an air-conditioning apparatus 100, and transmit a signal containing data required for the management apparatus for an air-conditioning apparatus 100 to perform a process. In Embodiment 1, a predicted time of arrival at the event hall is calculated as an arrival time, and a signal containing arrival time data and seat location information data is transmitted to the management apparatus for an air-conditioning apparatus 100. Each terminal device 200 includes a terminal-side arithmetic unit 201, a terminal-side communication unit 202, a terminal-side clock unit 203, a terminal-side storage unit 204, and a GPS unit 205.

The terminal-side arithmetic unit 201 performs various arithmetic processes involved in communication and control in the terminal device 200. In Embodiment 1, execution processes of applications stored by the terminal-side storage unit 204 are performed, and a process of calculating an arrival time and other processes are performed. The terminal-side communication unit 202 includes, for example, a wireless communication device or the like, communicates with the management apparatus for an air-conditioning apparatus 100, and receives a signal containing data required for the management-side arithmetic unit 101 to perform a process. The terminal-side clock unit 203 measures time for the terminal-side arithmetic unit 201 acquiring data of a time. With the GPS unit 205, the terminal-side arithmetic unit 201 acquires data of a current location of the terminal device 200.

Furthermore, the terminal-side storage unit 204 stores data and the like required for the terminal-side arithmetic unit 201 (terminal device 200) to perform a process. In particular, an electronic ticket application 211, a communication application 212, a GPS process application 213, and an arrival time prediction process application 214 are included here. The electronic ticket application 211 has data of an event start time, seat location information, and a location of the event hall, and is an application in which processes of executing the communication application 212 and so forth are performed. The communication application 212 is an application in which a process of communicating with the management apparatus for an air-conditioning apparatus 100 by using the terminal-side communication unit 202 is performed. The GPS process application 213 is an application in which a process of acquiring data of the current location of the terminal device 200 by using the GPS unit 205 is performed. The arrival time prediction process application 214 is an application in which a process of calculating an arrival time is performed.

FIG. 2 illustrates relationships between seats in an event hall and groups. The management apparatus for an air-conditioning apparatus 100 in Embodiment 1 performs manage control on a plurality of air-conditioning apparatuses installed in an event hall (event venue). Furthermore, the seats in the event hall are reserved seats, and, for example, a person who will attend an event makes a purchase or the like of an electronic ticket, and a seat is assigned to him/her.

The seats are 1-1 to 8-9, that is, there are eight rows with nine seats per row. Furthermore, the air-conditioning apparatuses condition air in the event hall in 6 groups of a group A to a group F. The group A is composed of air-conditioning apparatuses Ax to Az. Similarly, the group B is composed of air-conditioning apparatuses Bx to Bz. The group C is composed of air-conditioning apparatuses Cx to Cz. The group D is composed of air-conditioning apparatuses Dx to Dz. The group E is composed of air-conditioning apparatuses Ex to Ez. The group F is composed of air-conditioning apparatuses Fx to Fz.

A space in which the seats 1-1 to 4-3 are placed is an air-conditioning target space for the group A. Similarly, a space in which the seats 1-4 to 4-6 are placed is an air-conditioning target space for the group B. A space in which the seats 1-7 to 4-9 are placed is an air-conditioning target space for the group C. A space in which the seats 5-1 to 8-3 are placed is an air-conditioning target space for the group D. A space in which the seats 5-4 to 8-6 are placed is an air-conditioning target space for the group E. A space in which the seats 5-7 to 8-9 are placed is an air-conditioning target space for the group F. Although, for example, a plurality of air-conditioning apparatuses are divided into groups here, the relationships with the seats are not only defined by using the groups, but relationships between the seats and the air-conditioning apparatuses may also be defined.

Figure 3:
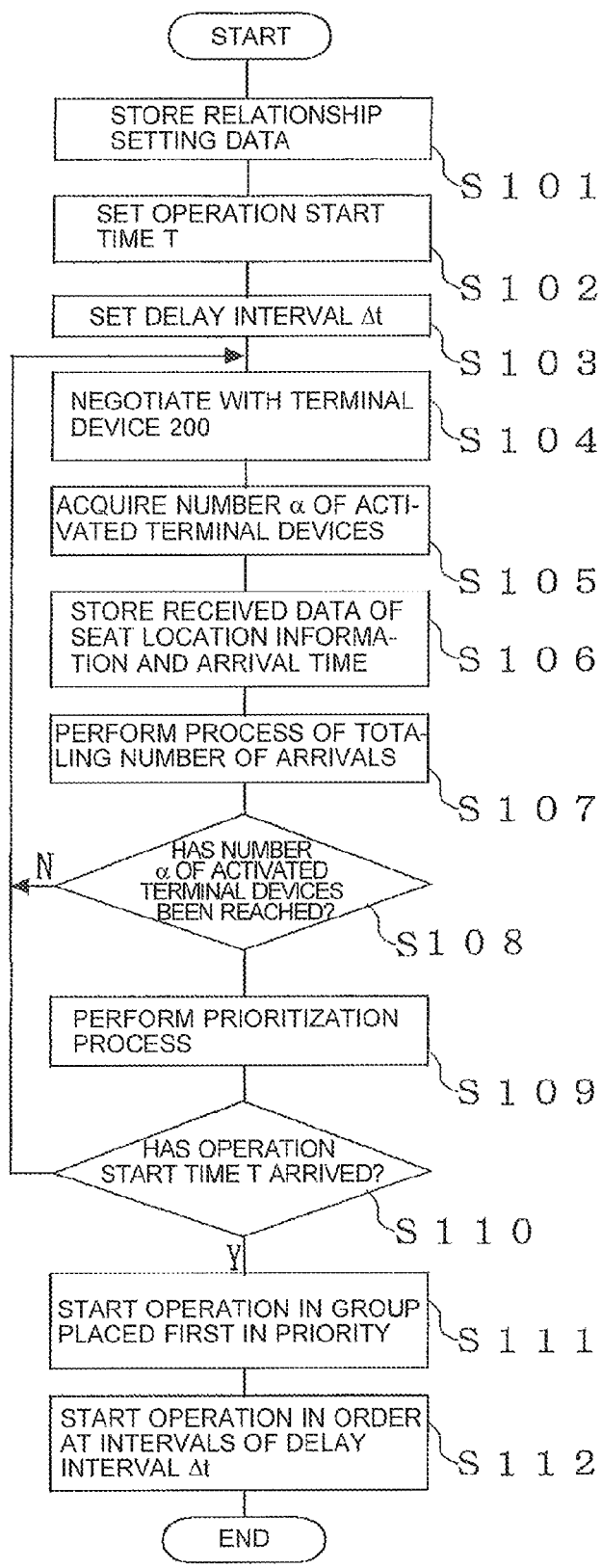
FIG. 3 illustrates a procedure of a process involved in controlling starts of operation of air-conditioning apparatuses in accordance with a start of an event in the management apparatus for an air-conditioning apparatus 100 according to Embodiment 1 of this invention.

FIG. 3 illustrates a procedure of a process involved in controlling starts of operation of the air-conditioning apparatuses in accordance with a start of the event in the management apparatus for an air-conditioning apparatus 100 according to Embodiment 1 of this invention. A process performed by the management apparatus for an air-conditioning apparatus 100 in Embodiment 1 will be described with reference to FIG. 3. The relationships between the reserved seats and the groups described using FIG. 2 are pre-stored, as relationship setting data, in the management-side storage unit 104 on the basis of, for example, an instruction of the administrator (S101).

Then, an operation start time T at which air-conditioning apparatuses start to operate is set via the operation schedule setting unit 105 (S102). For example, if doors at the event hall open at ten o'clock, the operation start time T is set to 9:30. Here, although the operation start time T is a time at which air-conditioning apparatuses belonging to a first group start to operate in Embodiment 1, setting is performed for the operation schedule so that all the air-conditioning apparatuses start to operate at once.

Furthermore, a delay interval Δt is set via the operation schedule setting unit 105 (S103). In Embodiment 1, in order to keep power consumption from being steeply increased due to the fact that all the air-conditioning apparatuses have started to operate at once, an order in which operation in each group is started is determined. Then, operation of air-conditioning apparatuses in each group is started at a different operation start time on the basis of the order in which operation is started. The delay interval Δt is an interval used for delaying the start of operation of air-conditioning apparatuses in a subsequent group on the basis of the start order.

In order to start to communicate with a terminal device 200, the management-side communication unit 102 negotiates with the terminal device 200 (terminal-side communication unit 202) (S104).

The number of terminal devices 200 that perform a negotiation here is a maximum of the number of reserved seats in the event hall involved in the setting in S101. It is noted that data is not necessarily obtained from all the terminal devices 200, and thus a definite number is acquired as the number α of activated terminal devices (S105).

The management-side communication unit 102 receives a signal from the terminal device 200 (terminal-side communication unit 202). Then, seat location information data and arrival time data that are contained in the signal are associated with each other, and stored in the management-side storage unit 104 (S106).

FIG. 4 illustrates an image of a totaling process result. As illustrated in FIG. 4, the number of arrivals in each time slot represents the total number of arrivals for up to the time slot. The management-side arithmetic unit 101 performs a process of compiling the number of arrivals in each group predicted on a time slot-by-time slot basis, on the basis of the seat location information data and the arrival time data (S107). A procedure of the totaling process will be described later.

The management-side arithmetic unit 101 determines whether or not the compiled number of arrivals has reached the number α of activated terminal devices (S108). When it is determined that the number α of activated terminal devices has not been reached, the process returns to S104, and the process is repeated with another terminal device 200.

FIG. 5 illustrates an image of a determination of a priority order made on the basis of a totaling result. When it is determined that the number α of activated terminal devices has been reached, a group prioritization process is performed from the distribution of the number of arrivals in each time slot obtained through the totaling process (S109).

In FIG. 5, for example, the group E has the largest number of arrivals in a time slot up to 10:00 which is the earliest meeting time. The group C has the largest number of arrivals in a subsequent time slot. Here, at 10:20, the group A and the group B have the same number of arrivals. In this case, an order is determined so that a group having larger number of arrivals than the other group in a subsequent time slot is prioritized.

Figures 6, 7:
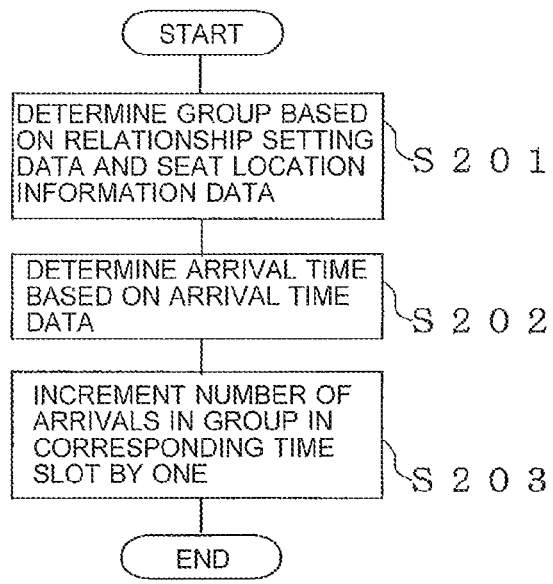
FIG. 6 illustrates a determined priority order.
FIG. 7 illustrates an example of a procedure of a totaling process performed in S107.

FIG. 6 illustrates a determined priority order. For example, FIG. 6 illustrates a priority order determined so that operation is started in the order of the group E, the group C, the group B, the group A, the group D, and the group F.

The air-conditioning apparatus control unit 106 determines whether or not the operation start time T has arrived (S110). When it is determined that the operation start time T has not arrived, the process returns to S104 to increase the accuracy of data involved in totaling, and the process is repeated with another terminal device 200. When it is determined that the operation start time T has arrived, operation of air-conditioning apparatuses belonging to a group placed first in priority is started (S111).

The air-conditioning apparatus control unit 106 starts operation of air-conditioning apparatuses belonging to each group in the priority order at intervals of the delay interval Δt (S112).

FIG. 7 illustrates an example of a procedure of the totaling process performed in S107. The management-side arithmetic unit 101 determines a corresponding group on the basis of the relationship setting data which is stored in the management-side storage unit 104 and the seat location information data which is transmitted from the terminal device 200 and is stored in the management-side storage unit 104 (S201). The management-side arithmetic unit 101 further determines an arrival time on the basis of the arrival time data in association with the seat location information data (S202). Then, the number of arrivals in the determined group in a time slot corresponding to the determined arrival time is incremented by one (S203).

Figure 8:
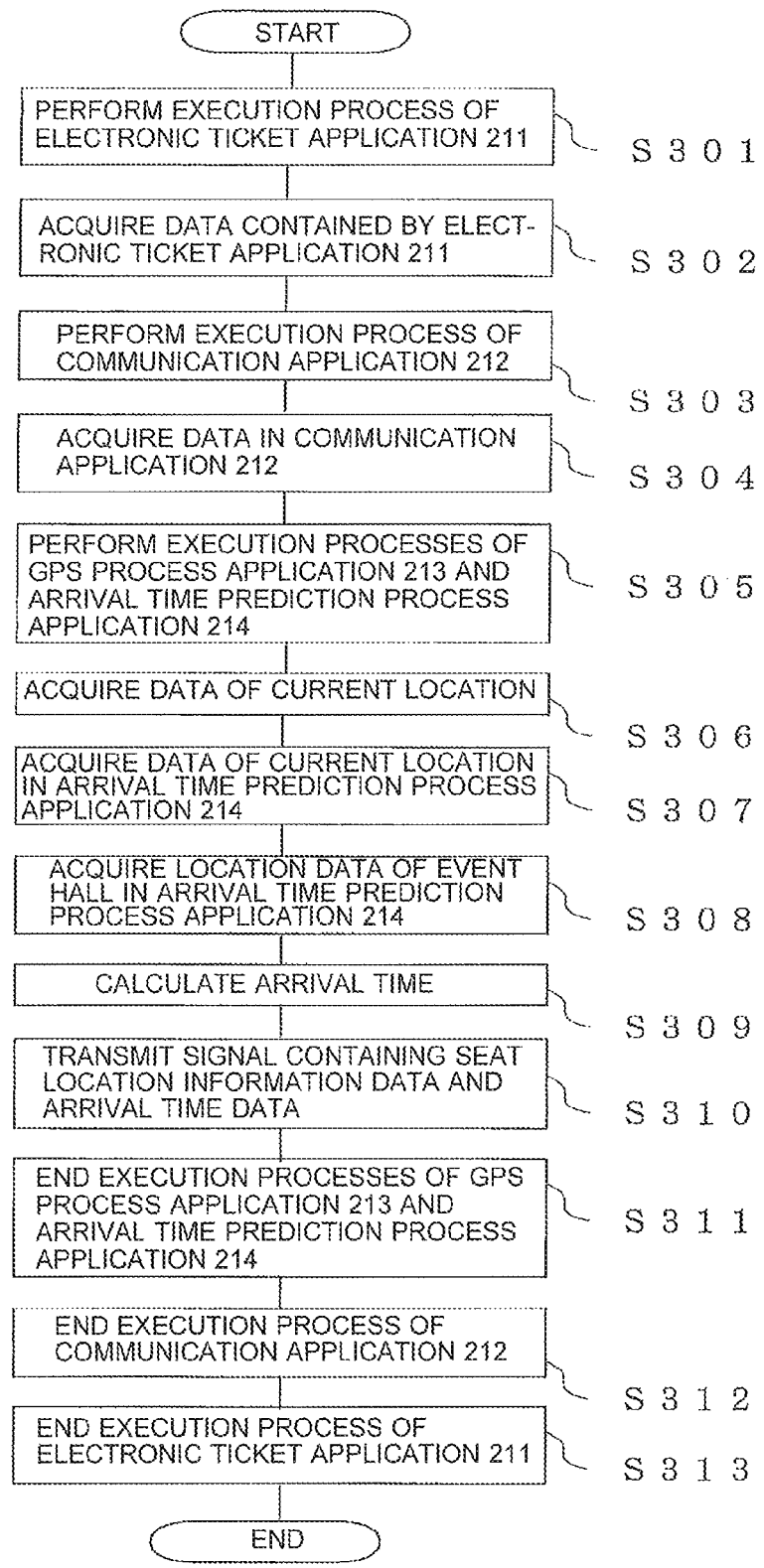
FIG. 8 illustrates a procedure of a signal transmission process performed by a terminal device 200 according to Embodiment 1 of this invention.

FIG. 8 illustrates a procedure of a signal transmission process performed by each terminal device 200 according to Embodiment 1 of this invention. Here, there will be described the process which is performed by the terminal-side arithmetic unit 201 performing execution processes of various applications stored by the terminal-side storage unit 204.

The terminal-side arithmetic unit 201 performs an execution process of the electronic ticket application 211 stored by the terminal-side storage unit 204 (S301). Then, data recorded in data contained by the electronic ticket application 211 is acquired (S302). Execution of the communication application 212 is further started within the execution process of the electronic ticket application 211 (S303). In the communication application 212, the data acquired in the execution process of the electronic ticket application 211 is acquired (S304).

Execution of the GPS process application 213 and the arrival time prediction process application 214 is further started within the execution process of the communication application 212 (S305). The execution process of the GPS process application 213 is performed, the GPS unit 205 is thereby operated, and data of a current location of the terminal device 200 is acquired (S306).

Subsequently, in the arrival time prediction process application 214, the data of the current location of the terminal device 200 acquired in the execution process of the GPS process application 213 is acquired (S307). Location data of the event hall acquired in the execution process of the electronic ticket application 211 is further acquired (S308). Then, in the arrival time prediction process application 214, an arrival time is calculated on the basis of the data of the current location of the terminal device 200, the location data of the event hall, and a time obtained by the terminal-side clock unit 203 (S309).

Through the execution process of the communication application 212, the terminal-side communication unit 202 is caused to transmit a signal containing seat location information data and arrival time data (S310). Then, the execution processes of the GPS process application 213 and the arrival time prediction process application 214 within the execution process of the communication application 212 are ended (S311). The execution process of the communication application 212 within the execution process of the electronic ticket application 211 is also ended (S312). Then, the terminal-side arithmetic unit 201 ends the execution process of the electronic ticket application 211 (S313).

As described above, according to Embodiment 1, when the management apparatus for an air-conditioning apparatus 100 conditions air in a space, such as an event hall, by using, for example, a plurality of air-conditioning apparatuses (groups), an order is determined in which operation of air-conditioning apparatuses belonging to each corresponding group is started in descending order of the number of people who arrive at their seats early on the basis of the relationships between seats serving as arrival locations and the groups (air-conditioning apparatuses), and thus operation can be started in order on the basis of how many people gather in the event hall. At this time, since operation of the air-conditioning apparatuses is started in the determined order of group at a different time based on the determined delay interval Δt, operation of all the air-conditioning apparatuses does not have to be started at once, and a steep increase in power can be reduced. At this time, a priority order can be determined when seat location information data and arrival time data are obtained from each terminal device 200, and thus consideration can be given to privacy or the like.

REFERENCE SIGNS LIST 100 management apparatus for an air-conditioning apparatus 101 management-side arithmetic unit 102 management-side communication unit 103 management-side clock unit 104 management-side storage unit 105 operation schedule setting unit 106 air-conditioning apparatus control unit 200 terminal device 201 terminal-side arithmetic unit 202 terminal-side communication unit 203 terminal-side clock unit 204 terminal-side storage unit 205 GPS unit 211 electronic ticket application 212 communication application 213 GPS process application 214 arrival time prediction process application 300 telecommunication network

The invention claimed is:

1. A management apparatus for an air-conditioning apparatus, the management apparatus being configured to manage a plurality of air-conditioning apparatuses configured to condition air in an air-conditioning target space, the management apparatus comprising:
   a management-side communication unit to receive data of predicted arrival times and arrival locations transmitted from a plurality of terminal devices, the predicted arrival times being times at which holders of the terminal devices should arrive at the air-conditioning target space from outside, the arrival locations being locations in the air-conditioning target space at which the holders will stay; and
   a management-side arithmetic unit to perform a totaling operation of a number of the holders that should arrive at each of the arrival locations at each of the predicted arrival times, based on the data of the arrival locations and the predicted arrival times received by the management-side communication unit, and to perform a process of determining an order in which each of the plurality of air-conditioning apparatuses starts to operate.

2. The management apparatus of claim 1,
   wherein an operation start time and an operation interval are set, and
   wherein the management apparatus further comprises an air-conditioning apparatus control unit to, when the operation start time arrives, start operation of the air-conditioning apparatuses at intervals of the operation interval in the order in which operation is started.

3. The management apparatus of claim 1, further comprising
   a management-side storage unit to store correspondence relationships between a plurality of spaces obtained by dividing the air-conditioning target space and the plurality of air-conditioning apparatuses,
   wherein the management-side arithmetic unit is configured to perform a process of determining the air-conditioning apparatuses corresponding to the spaces containing the arrival locations based on the data of the arrival locations.

4. The management apparatus of claim 1, wherein the management-side arithmetic unit is configured to perform the totaling operation on a predetermined time slot-by-time slot basis, based on the predicted arrival times.

5. The management apparatus of claim 1,
   being configured to divide the plurality of air-conditioning apparatuses into a plurality of groups, and manage the plurality of air-conditioning apparatuses on a group-by-group basis.

6. The management apparatus of claim 1,
   being configured to define the arrival locations by seats in the air-conditioning target space.

7. A management system for an air-conditioning apparatus comprising:
   a plurality of terminal devices each including a terminal-side storage unit to store data of an arrival location, a GPS unit to measure a current location, a terminal-side arithmetic unit to calculate an arrival time at the arrival location based on data of a current location measured by the GPS unit and the data of the arrival location, and a terminal-side communication unit to transmit data of the arrival location and the arrival time; and
   the management apparatus of claim 1.

* * * * *